July 6, 1954  H. E. VAN VALKENBURG  2,682,766
ULTRASONIC INSPECTION DEVICE
Filed Aug. 17, 1950

*INVENTOR.*
HOWARD E. VAN VALKENBURG
BY
Joseph H. Lipschutz
ATTORNEY.

Patented July 6, 1954

2,682,766

UNITED STATES PATENT OFFICE 2,682,766

ULTRASONIC INSPECTION DEVICE

Howard E. Van Valkenburg, Danbury, Conn., assignor to Sperry Products, Inc., Danbury, Conn., a corporation of New York Application August 17, 1950, Serial No. 179,975

3 Claims. (Cl. 73—67)

This invention relates to the ultrasonic inspection of materials by transmitting ultrasonic pulses therein and indicating on a cathode ray tube the presence of reflecting surfaces therein. More particularly this invention relates to the type of ultrasonic inspection in which an extended coupling medium is employed between the pulse transmitter and the object to be inspected. Such extended medium is useful when testing an object for defects lying close to the surface, for testing curved surfaces, rough surfaces and thin sections, and in automatic scanning and inspection of sheet. Coupling mediums employed for this purpose include liquids such as oil, water and mercury, attenuating solids such as plastics and lead, and metals such as aluminum, steel and brass. Non-liquid mediums usually require a thin liquid layer between the medium and the object.

To prevent spurious signals due to multiple echoes in the couplant, the pulse delay introduced by the extended coupling medium must be great compared to the pulse delay for the depth to be tested in the material under inspection. Because of this large ratio of coupling medium to depth of material to be tested, a small percentage variation in the medium may cause a large shift in the position of the desired echoes on the cathode ray tube screen. Such variations may result from high temperature of coefficient of velocity in the coupling materials, or from mechanical shifts in spacing between the pulse transmitter and the object under test. Thus, in the practice heretofore employed where the cathode ray tube sweep indicated the time interval between the transmission of the pulse into the coupling medium and the reception of reflections from the object under test, the time interval between the original pulse generation and the receipt of the first reflection from the surface of the object would be large relative to the elapsed time between receipt of reflections from the surface of the object and from further reflecting surfaces in the object. This is particularly true of defects lying close to the entering surface of the object. A small percentage variation between the time of transmission of the pulse and the receipt of the first reflection would thus introduce a large error in the position of the first reflection, and since the first reflection serves as the index for the second reflection, the result would be a varying index requiring repeated calibration and preventing rapid determination of the condition of a large number of similar articles in mass production. This is true particularly in the case where a curved or other irregular surface is scanned, in which case the index would shift continuously.

It is therefore the principal object of this invention to provide a means for insuring a fixed position on the sweep for the first reflection which serves as the index to which subsequent reflections are related. Further objects and advantages of this invention will become apparent in the following detailed description thereof.

In the accompanying drawings.

Figure 1:
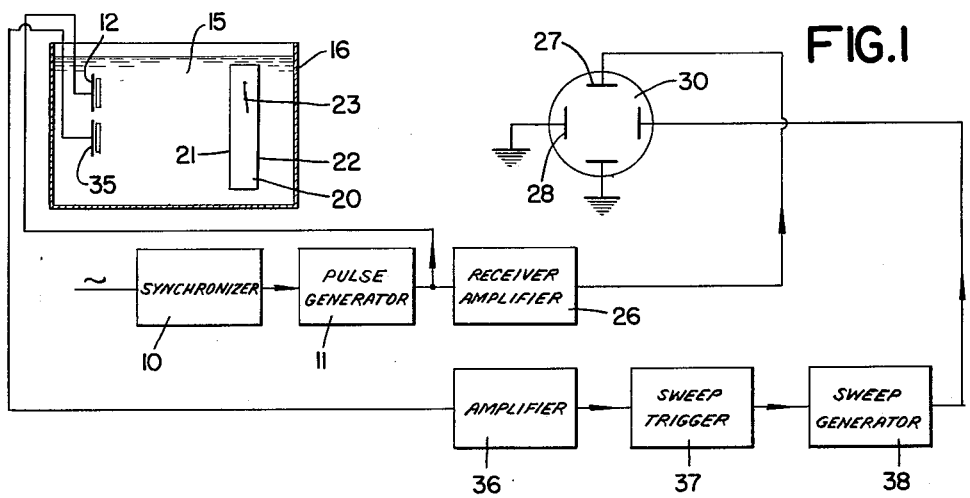
Fig. 1 is an electric block wiring diagram illustrating one form of my invention employing a plurality of transducers.

Referring to Fig. 1, there is shown a synchronizer 10 which may be periodically energized, as from a 60 cycle A. C. source, to periodically trigger a pulse generator 11. The pulses thus generated periodically are applied to an electro-acoustic transducer 12 which transforms the electrical vibrations into mechanical vibrations. The transducer 12 may be a quartz crystal immersed in a liquid 15 in a tank 16 within which is positioned an object 20 which is to be inspected for flaws. The mechanical pulses transmitted by crystal 12 strike the surface 21 of object 20 and are reflected back to crystal 12 to transform the mechanical vibrations into electric vibrations. Further reflections of the transmitted pulses will be received from rear surface 22 of the object and from any internal reflecting surfaces such as defect 23. The voltages generated by crystal 12 may be amplified by amplifier 26 whose output is applied to the vertical plates 27 of a cathode ray tube 30 to produce vertical deviations in a horizontal sweep between horizontal plates 28.

Heretofore it was customary to trigger the sweep simultaneously with the generation of the pulse by the pulse generator 11, so that there appeared on the cathode ray tube screen the deviation corresponding to the pulse generation, the deviations corresponding to the reflections from front and back surfaces of the object under test, and the deviations due to any internal reflecting surfaces such as fissure 23. As set forth in the introduction hereto, this led to variable positioning of the reflection indications due to variations in the relatively long coupling medium.

As a result there was no fixed index to which the reflection indication of a defect could be related. By this invention I cause the sweep to be triggered by the reception of the first reflection at the transmitting point. This reflection corresponds to the front face 21 of the object under test and is always fixed at the same point on the cathode ray tube, and therefore any further reflections (as, for instance, from defect 23) will always bear a constant relation to this index regardless of the changes in the medium between the transmitter and the object.

In order to accomplish the foregoing result I provide in the Fig. 1 form a second electro-acoustic transducer 35 which may be a quartz crystal positioned adjacent crystal 12. The original pulse transmitted by crystal 12 is highly directional because of its high frequency and will have little effect on crystal 35. The return of the first reflection from surface 21 will, however, be received by both crystals, and the voltage generated by crystal 35, after being amplied by amplifier 36, will energize a sweep trigger 37 to trip the sweep generator 38. Thus the sweep is synchronized with the reception of the first reflection from the object under test to provide a fixed index.

Multiple triggering of the sweep circuit is prevented by making the recovery time of the sweep generator long compared with the first few subsequent reflections which will be rapidly attenuated.

Figure 2:
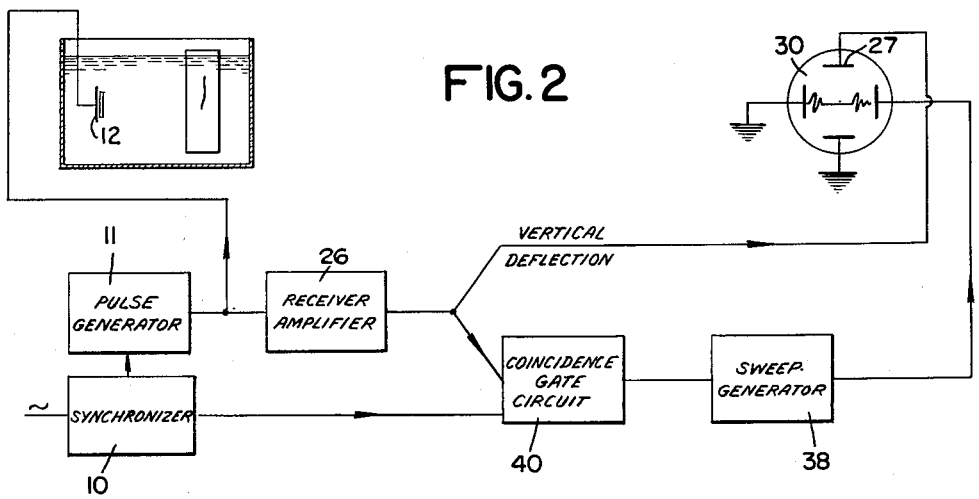
Fig. 2 is a view similar to Fig. 1 showing another form of my invention employing a single transducer.
Figure 3:
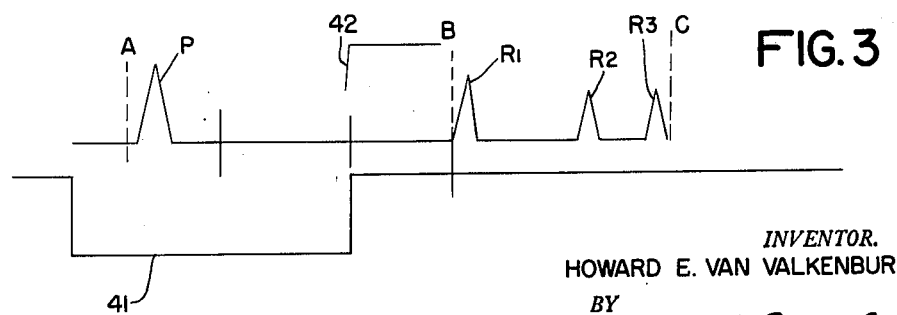
Fig. 3 is a graph illustrating the theory of this invention.

In the Fig. 2 form of the invention, a single crystal 12 may be utilized to perform the functions of transmitting and receiving pulses and starting the sweep in synchronism with the reception of the first reflection. As in Fig. 1, the synchronizer 10 periodically energizes pulse generator 11 to apply pulses to the crystal 12 which transmits the pulses and receives reflections thereof from the object 20. The signal voltages on crystal 12 are amplified by receiver amplifier 26 and applied to the vertical plates 27 of cathode ray tube 30. In order to trigger the sweep in synchronism with the reception by crystal 12 of the first reflection from object 20, a delay in energizing sweep generator 38 is introduced by means of a coincidence gate circuit 40 which will not energize the sweep generator until two positive voltages are applied simultaneously. The synchronizer 10 periodically applies a negative voltage signal to gate circuit 40 of a duration at least as long as the generated pulse, but the end of the negative signal will not render circuit 40 conductive until a second positive voltage signal is received thereby. This second positive signal will be generated when the first reflection from object 20 is received by crystal 12, and the output from amplifier 26 is applied to circuit 40. Thus, referring to Fig. 3, it will be seen that the negative pulse 41 applied to gate circuit 40 prevents the gate circuit from becoming effective until after the transmission of pulse P has ended. The end of negative pulse 41 causes the gate circuit to return to positive condition, as indicated at 42; but it is not until the receipt of the first reflection R1 from surface 21 that the gate circuit will energize the sweep generator. Thereupon, reflections R1, R2 and R3 corresponding to face 21, defect 23 and face 22 will be received.

Having described my invention, what I claim and desire to secure by Letters Patent is:

1. A pulse echo system for inspecting objects, comprising means for generating electrical pulses of ultrasonic frequency, electro-acoustic transducer means energized by said pulse generating means for transmitting ultrasonic pulses to the object through a coupling medium and receiving reflections of said pulses, an amplifier connected to said transmitting and receiving means, an indicator actuated by the output voltages of said amplifier, said indicator comprising a cathode ray tube having vertical and horizontal sets of plates, a sweep circuit for establishing a sweep between one set of plates, said amplifier being connected to the other set of plates, and means actuated by the return of the first reflection from said object for rendering said sweep circuit effective.

2. A pulse echo system for inspecting objects, comprising means for generating electrical pulses of ultrasonic frequency, an electro-acoustic transducer energized by said pulse generating means to transmit ultrasonic pulses to the object through a coupling medium and to receive reflections of said pulses, an indicator actuated by the signal voltages of said transducer, said indicator comprising a cathode ray tube having vertical and horizontal sets of plates, a sweep circuit for establishing a sweep between one set of plates, receiver means connected to said transducer and to the other set of plates for applying the signal voltages of said transducer to the other set of plates, and a second electro-acoustic transducer connected to the sweep circuit and energized by the return of the first pulse reflection from said object, whereby the energization of said second transducer renders said indicator effective.

3. A pulse echo system for inspecting objects, comprising a synchronizer adapted to be periodically energized to generate a signal, means energized by the signals from said synchronizer for generating electrical pulses of ultrasonic frequency, an electro-acoustic transducer energized by said pulse generating means to transmit ultrasonic pulses to the object through a coupling medium and to receive reflections of said pulses, an amplifier connected to said transducer, an indicator actuated by the signal voltages of said amplifier, said indicator comprising a cathode ray tube having vertical and horizontal sets of plates, a sweep circuit for establishing a sweep between one set of plates, means for applying the signal voltages of the amplifier to the other set of plates, means including a coincidence gate circuit connected to the sweep circuit for controlling the sweep circuit, said gate circuit being energized from said synchronizer and said amplifier, means whereby the synchronizer applies a negative voltage to the gate circuit for a period at least equal to the generation of each ultrasonic pulse, said gate circuit rendering said sweep circuit effective when the negative voltage ends and a positive voltage is applied to the gate circuit by the amplifier.

References Cited in the file of this patent

UNITED STATES PATENTS

| Number | Name | Date |
|---|---|---|
| 1,972,889 | Hayes | Sept. 11, 1934 |
| 2,280,226 | Firestone | Apr. 21, 1942 |
| 2,467,301 | Firestone | Apr. 12, 1949 |
| 2,483,821 | Firestone | Oct. 4, 1949 |
| 2,489,860 | Carlin | Nov. 29, 1949 |